W. D. ORCUTT.
Rotary-Cutter for Trimming Shoe-Soles.

No. 212,971. Patented Mar. 4, 1879.

Witnesses:
E. A. Hemmenway
W. E. Lombard

Inventor:
William D. Orcutt
by N. C. Lombard
Attorney.

UNITED STATES PATENT OFFICE.

WILLIAM D. ORCUTT, OF BOSTON, MASSACHUSETTS.

IMPROVEMENT IN ROTARY CUTTERS FOR TRIMMING SHOE-SOLES.

Specification forming part of Letters Patent No. 212,971, dated March 4, 1879; application filed January 6, 1879.

*To all whom it may concern:*

Be it known that I, WILLIAM D. ORCUTT, of Boston, in the county of Suffolk and State of Massachusetts, have invented a new and useful Improvement in Rotary Cutters for Sole and Heel Edge Trimming Machines and other Purposes, of which the following, taken in connection with the accompanying drawings, is a specification.

My invention relates to that class of rotary cutters for trimming the edges of soles and heels of boots and shoes, and for other purposes, in which a series of cutting-teeth, projecting outward from a common hub or center, are used, and is especially applicable to cutters designed to mold the edge of the sole or form thereon a fancy edge of any desired pattern.

It is well known that in some styles of goods it is very desirable to form upon the sole a fancy or ornamental edge, and it is also well known that a rotary cutter provided with a considerable number of teeth does better work than one with only one or two cutting-blades; but heretofore it has been found to be a difficult matter to construct a cutter having a large number of cutting teeth or blades with the desired design molded upon their peripheries or outer ends, with the necessary clearance or "backing off," so called, and have them all of uniform shape, and their cutting-edges equidistant from their common axis of revolution; and the difficulty of accomplishing this desirable end has necessarily made such cutters expensive.

The object of my invention is to overcome this difficulty and produce a better cutter at less cost than could be produced in the old way; and it consists in first turning upon the periphery of a solid disk or hub of steel the desired molding, or the reverse of the shape that it is desired to give to the sole-edge, cutting a series of slits into said periphery at an angle to said peripheral surface, so as to form said periphery into a series of cutting-teeth of uniform shape and size, projecting radially or in a direction inclined to a radial line from a common hub, with their outer or peripheral ends concentric with the axis of said hub, and then bending each of said teeth so as to throw its cutting-edge backward and its front face into a different angular position relative to the hub, with its outer or peripheral end eccentric to the axis of the cutter, as will be described.

Figure 1:
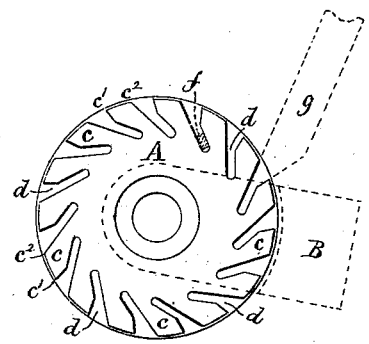
Figure 3:
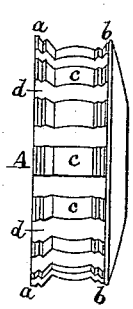
Figure 2:
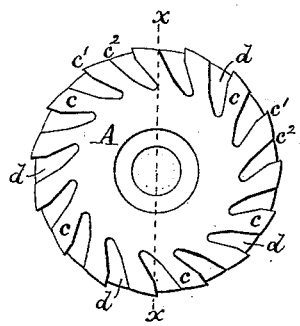

Figure 1 of the drawings is a side elevation of my improved cutter before the cutting-blades have been set back to produce the desired backing off or clearance. Fig. 2 is a similar elevation of the finished tool. Fig. 3 is an edge view, and Fig. 4 is a section on line $x\,x$ on Fig. 2.

Figure 4:
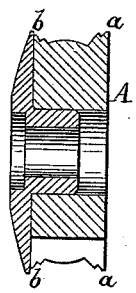

In the drawings, A is a rotary cutter, having its outer or peripheral edge molded to any desired ornamental shape, as shown from $a$ to $b$, Figs. 3 and 4. Cutting teeth or blades $c\,c$ are formed around the periphery of said cutter by cutting therein longitudinal slits $d$, preferably at an angle to a radial line, as shown in Fig. 1, the whole being formed from a single piece of steel.

When the cutter has been formed as shown in Figs. 1 and 3, it is worthless for the purposes of a cutter until another operation is performed thereon, to give to the blades $c$ the necessary tooth, which has heretofore been accomplished by backing off the peripheral end of each blade by cutting away the stock from the cutting-edge $c^1$ to the heel $c^2$, so as to make such surface eccentric to the axis of the cutter, with the edge $c^1$ farthest from said axis. This, when done by hand, was a laborious and expensive operation, and to do it by machinery required a costly machine and an experienced operator to run it, and even then there was danger of destroying the uniformity of shape of the several cutting-edges.

When the cutter is so far completed as shown in Fig. 1, I change the angle of the blades $c\,c$ by bending them outward or backward into the positions shown in Fig. 2. This may be accomplished in several ways, one of which I have used with success, and it consists in placing in the bottom of the slit $d$ a steel spindle or shaft, having a rectangular cross-section and a thickness just sufficient to fill the whole width of the slit, and rotating or partially rotating it, moving its outer edge in the direction that it is desired to move the blade $c$, said shaft or spindle being shown in position in cross-section in dotted lines at $f$ in Fig. 1.

Another way is to use a lever, as shown at *g* in dotted lines in Fig. 1, and pry the blade outward till its periphery comes in contact with a gage, B. (Shown in dotted lines in Fig. 1.)

When the blades *c c* have all been set back, as described, the cutter is tempered and the blades are sharpened by grinding the front radial face of each blade, in a well-known manner.

What I claim as new, and desire to secure by Letters Patent of the United States, is—

The method of producing the backing off or clearance in the blades of rotary cutters herein set forth, consisting in turning off the peripheral ends of all of said blades at once to a uniform shape and length, and concentric with the axis of the cutter, and then bending each of said blades backward, to throw their peripheral or outer surfaces into position eccentric to said axis, with their cutting-edges farthest therefrom, substantially as and for the purposes described.

Executed at Boston, Massachusetts, this 31st day of December, A. D. 1878.

WILLIAM D. ORCUTT.

Witnesses:
N. C. LOMBARD,
E. A. HEMMENWAY.